(12) United States Patent
Park et al.

(10) Patent No.: US 7,619,048 B2
(45) Date of Patent: Nov. 17, 2009

(54) METHOD FOR PRODUCING PROPYLENE POLYMER USING ALKOXYSILANE COMPOUND CONTAINING TRIALKYSILYL GROUP IN MOLECULAR STRUCTURE

(75) Inventors: Joon-Ryeo Park, Seoul (KR); Ho-Sik Chang, Daejon (KR); Young-Joo Lee, Inchon (KR); Jin-Kyu Ahn, Seoul (KR)

(73) Assignee: Samsung Total Petrochemicals Co., Ltd., Seosan-shi, Chungcheongnam Province (KR)

( * ) Notice: Subject to any disclaimer, the term of this patent is extended or adjusted under 35 U.S.C. 154(b) by 666 days.

(21) Appl. No.: 11/381,761

(22) Filed: May 5, 2006

(65) Prior Publication Data

US 2007/0078240 A1  Apr. 5, 2007

(30) Foreign Application Priority Data

Sep. 30, 2005  (KR) ...................... 10-2005-0091950

(51) Int. Cl.
*C08F 4/642* (2006.01)
*C08F 4/649* (2006.01)

(52) U.S. Cl. ................. 526/125.3; 526/125.6; 526/351; 502/116; 502/125; 502/127

(58) Field of Classification Search ................. 502/116; 526/125.3, 351
See application file for complete search history.

(56) References Cited

U.S. PATENT DOCUMENTS

| 4,952,649 | A | 8/1990 | Kioka et al. |
| 6,384,160 | B1 | 5/2002 | Shamshoum et al. |

FOREIGN PATENT DOCUMENTS

| JP | 2170803 | 7/1990 |
| JP | 3033105 | 2/1991 |
| JP | 3033106 | 2/1991 |
| JP | 8157520 | 6/1996 |

*Primary Examiner*—Caixia Lu
(74) *Attorney, Agent, or Firm*—Barlow, Josephs & Holmes, Ltd.

(57) ABSTRACT

Disclosed is a method for producing a propylene polymer using an alkoxysilane compound comprising a trialkylsilyl group in its molecular structure, specifically a method for easily producing an isotactic propylene polymer with dramatically improved melt flowability, owing to the improved reactivity of hydrogen that is provided as a molecular weight regulator, by specifically using an alkoxysilane compound comprising a trialkylsilyl group in the molecular structure thereof as an external electron donor in propylene polymerization.

7 Claims, No Drawings

METHOD FOR PRODUCING PROPYLENE POLYMER USING ALKOXYSILANE COMPOUND CONTAINING TRIALKYSILYL GROUP IN MOLECULAR STRUCTURE

BACKGROUND OF THE INVENTION

The present invention relates to a method for producing a propylene polymer which includes the use of an alkoxysilane compound having a trialkylsilyl group in the molecular structure thereof, specifically to a method for easily producing an isotactic propylene polymer having dramatically improved melt flowability by characteristically using an alkoxysilane compound having a trialkylsilyl group in the molecular structure thereof as an external electron donor so as to improve the reactivity of hydrogen that is served as a molecular weight regulator.

The catalyst system used in gas phase polymerization, slurry polymerization and bulk polymerization of propylene is generally comprised of a Ziegler type catalyst, alkyl aluminum and an external electron donor. In the general catalyst system for propylene polymerization, it is well known that the external electron donor has a function of improving the isotactic index, i.e. the stereoregularity of the resulted polymer, by selectively poisoning or converting the non-stereoregular active sites present on the surface of a solid catalyst. It means that, depending on the molecular structure of an external electron donor used, the stereoregularity, the activity and the molecular weight distribution of the resulted polypropylene polymer become varied. In this regard, in order to obtain a polypropylene polymer having improved properties as described above, various conventional techniques particularly using various silane compounds as an external donor have been known in this field.

For example, Japanese laid-open patent publication Heisei 3-33105 and Heisei 3-33106 disclose a method for producing polypropylene which has high stereoregularity by using a solid catalyst component synthesized from a supporter which has been obtained from the reaction between silica and dialkyl magnesium, triethyl aluminum and, as an external electron donor, dialkyl dimethoxysilane compound(s). However, when using a dialkyl dimethoxysilane compound as an external electron donor, as in the above-said invention, a problem would occur that the hydrogen reactivity becomes significantly reduced.

As another example, U.S. Pat. No. 4,952,649 discloses a method for producing high stereoregular polypropylene having the isotacticity index of 96~98%, by preparing a solid catalyst particles obtained from the reaction of a solution of magnesium chloride in 2-ethylhexyl alcohol with titanium tetrachloride and dialkylphthalate at −20~130° C., and then carrying out bulk polymerization of propylene by using the solid catalyst obtained as above together with a cocatalyst triethyl aluminum and various dialkyl dialkoxysilanes as an external electron donor. Further, in U.S. Pat. No. 6,384,160, a method for producing polypropylene having the isotacticity index of 92~98% is disclosed by using a solid catalyst component, triethyl aluminum as a cocatalyst and dialkyl dimethoxysilane as an external electron donor, wherein the solid catalyst component is obtained by reacting diethoxymagnesium, titanium tetrachloride and diisobutyl phthalate or diethylphthalate as an internal electron donor.

However, when using the main catalyst component and external electron donor as disclosed in the above-mentioned U.S. patents, the reactivity of hydrogen which is used as a molecular weight regulator would not be sufficient enough to practically prepare polypropylene having the melt flow rate of 50 g/10 minutes or more. Particularly, in practical commercial processes, when introducing a large amount of hydrogen into a polymerization reactor so as to complement the insufficient hydrogen reactivity, there will be a risk of explosion or the like owing to the limitation in designed pressure resistance. It means that the amount of hydrogen being applied into a commercial process is substantially limited. Therefore, in practically operated commercial processes, when using the main catalyst component and the external electron donor disclosed in the above-mentioned US patents, there will be a problem that hydrogen cannot be introduced in an amount sufficient to provide the enough pressure for preparing polypropylene having high melt flowability.

In Japanese laid-open patent publication Sho 57-63311, a method for olefin polymerization comprising the use of phenyl triethoxysilane as an external electron donor is disclosed, but it poses a problem of toxicity owing to phenyl group left from the external electron donor after completing the polymerization process. Further, a method for olefin polymerization using dialkyl dimethoxysilane disclosed in Japanese laid-open patent publication Heisei 2-170803, has a disadvantage that it is impossible to prepare a polymer having high melt index. According to another method for olefin polymerization disclosed in Japanese patent publication Heisei 8-157520, which uses alkyl alkoxysilane substituted with a cycloalkyl group as an internal electron donor, it has a problem of significantly low catalyst activity while achieving relatively higher degree of melt flowability of the resulted polymer.

SUMMARY OF THE INVENTION

The present invention has been designed to solve these problems of above-mentioned conventional techniques. Therefore, the object of the present invention is to provide a method for conveniently producing a propylene polymer having 97% or more of the isotacticity index that is sufficiently high for being used in commercial processes, and improved melt flow rate that is much higher than that could be obtained from a conventional process with the same amount of hydrogen being introduced into a reactor, since the reactivity of a molecular weight regulator, i.e. hydrogen has been significantly improved through a simple method of applying a specific compound as an external electron donor in propylene polymerization which includes the use of a Ziegler type catalyst system.

DETAILED DESCRIPTION OF THE INVENTION

According to the present invention, a method for producing a propylene polymer using a catalyst system for propylene polymerization, wherein the catalyst system comprises: a Ziegler type catalyst comprising magnesium, titanium, halogen and an internal electron donor as a main catalyst component; an alkyl aluminum compound as a cocatalyst; and an alkoxysilane compound comprising a trialkylsilyl group in the molecular structure thereof as an external electron donor.

In the catalyst system for propylene polymerization used in the method for producing a propylene polymer according to the present invention, the main catalyst component is a conventional Ziegler type solid catalyst that is preferably comprised of magnesium, titanium, halogen and an internal electron donor. Although the ratio of each component of the solid catalyst is not specifically restricted, it is preferred to have the ratio of 5~40 wt % of magnesium, 0.5~10 wt % of titanium, 50~85 wt % of halogen and 2.5~30 wt % of an internal electron donor, for good catalyst activity.

There is no specific limitation in magnesium sources included in the main catalyst component. Thus, any magnesium compound that is generally used in the preparation of a Ziegler type catalyst for olefin polymerization, such as magnesium chloride, dialkoxymagnesium, alkoxymagnesium chloride and the like can be used in the preparation of the main catalyst component of the present invention without limitation, and among these above-mentioned, dialkoxymagnesium is preferably used. Dialkoxymagnesium can be obtained from the reaction between metal magnesium and an alcohol, and is provided as a supporter having a spherical particle shape which is maintained throughout the propylene polymerization.

Further, there is no specific limitation in titanium sources included in the main catalyst component. Therefore, any titanium compound that is generally used in the preparation of a Ziegler type catalyst for olefin polymerization can be used in the preparation of the main catalyst component of the present invention without limitation, and preferably used is titanium tetrachloride.

As for the internal electron donor included in the main catalyst component, it is not specifically limited, and thus any compound which is used as an internal electron donor in the preparation of a Ziegler type catalyst for olefin polymerization such as alcohols, ethers, ketones, carboxylic acids and the like can be applied to the preparation of the main catalyst component without limitation. Among these mentioned as an internal electron donor, preferably used are carboxylic acids, and more preferably used is a mixture of at least one selected from benzene-1,2-dicarboxylate compounds. As the specific examples of the benzene-1, 2-dicarboxylate compounds, mentioned may be dimethyl phthalate, diethyl phthalate, di-n-propyl phthalate, di-isopropyl phthalate, di-n-butyl phthalate, di-isobutyl phthalate, di-n-pentyl phthalate, di(2-methylbutyl)phthalate, di(3-methylbutyl)phthalate, di-neopentyl phthalate, di-n-hexyl phthalate, di(2-methylpentyl)phthalate, di(3-methylpentyl)phthalate, di-isohexyl phthalate, di-neohexyl phthalate, di(2,3-dimethylbutyl)phthalate, di-n-heptyl phthalate, di(2-methylhexyl)phthalate, di(2-ethylpentyl)phthalate, di-isoheptyl phthalate, di-neoheptyl phthalate, di-n-octyl phthalate, di(2-methylheptyl)phthalate, di-isooctyl phthalate, di(3-ethylhexyl)phthalate, di-neooctyl phthalate, di-n-nonyl phthalate, di-isononyl phthalate, di-n-decyl phthalate, di-isodecyl phthalate and the like.

The method for preparing the main catalyst component is not specifically limited, and thus it can be prepared according to any conventional method for producing a Ziegler type catalyst for olefin polymerization. For example, the main catalyst component can be prepared by: suspending a magnesium source compound and a titanium source compound in an aliphatic hydrocarbon solvent such as octane, nonane, decane or the like, or in an aromatic hydrocarbon solvent such as toluene, xylene or the like inside a reactor equipped with a stirrer, wherein the reactor has been dried by substantially removing moisture under inert gas atmosphere; adding an internal electron donor to the resulted suspension; allowing the mixture to stand for reaction at 90-130° C.; if necessary, further bringing the reacted mixture into contact with an additional titanium compound; and washing the resulted product with an organic solvent. The above processes can be repeated twice or more, if necessary, to obtain main catalyst component.

As for the cocatalyst component of the catalyst system for propylene polymerization used in the method for producing a propylene polymer according to the present invention, alkyl aluminum compounds generally employed in propylene polymerization is used, and specifically those represented by a general formula of $AlR^1_3$, wherein $R^1$ is an alkyl having 1~4 carbon atoms, can be preferably used. As a specific example, trimethyl aluminum, triethyl aluminum, tripropyl aluminum, tributyl aluminum, triisooctyl aluminum or the like can be mentioned.

In the catalyst system for propylene polymerization used in the method for producing a propylene polymer according to the present invention, in order to improve the reactivity of hydrogen which is added as a molecular weight regulator during polymerization, an alkoxysilane compound having a trialkylsilyl group in its molecular structure is used as the external electron donor, and it is preferred to use an alkoxysilane compound represented as a general formula of $[R^2R^3R^4SiX]_m SiR^5_n (OR^6)_{4-m-n}$, wherein each of $R^2$, $R^3$, $R^4$ and $R^5$ is an alkyl having 1~6 carbon atoms, respectively; X represents $—(CH_2)_p—$ wherein p is an integer of 1~4 or $—O—$; $R^6$ is an alkyl having 1~3 carbon atoms; m is an integer of 1 or 2; n is an integer of 0 or 1; and m+n is an integer of 1 or 2. Among these, more preferably used are trialkoxysilane compounds having a trimethylsilyl group, wherein each of $R^2$, $R^3$ and $R^4$ is a methyl group, m is 1 and n is 0.

Specific examples of the alkoxysilane compound comprising a trialkylsilyl group in its molecular structure, which is used as an external electron donor, include the following compounds: when X is $—(CH_2)_p—$ wherein p is an integer of 1~4, $(CH_3)_3SiCH_2Si(OCH_3)_3$, $(CH_3)_3SiCH_2Si(OC_2H_5)_3$, $(CH_3)_3SiCH_2Si(OC_3H_7)_3$, $(CH_3)_3Si(CH_2)_2Si(OC_3)_3$, $(CH_3)_3Si(CH_2)_2Si(OC_2H_5)_3$, $(CH_3)_3Si(CH_2)_2Si(OC_3H_7)_3$, $(CH_3)_3Si(CH_2)_3Si(OCH_3)_3$, $(CH_3)_3Si(CH_2)_3Si(OC_2H_5)_3$, $(CH_3)_3Si(CH_2)_3Si(OC_3H_7)_3$, $(CH_3)_3Si(CH_2)_4Si(OCH_3)_3$, $(CH_3)_3Si(CH_2)_4Si(OC_2H_5)_3$, $(CH_3)_3Si(CH_2)_4Si(OC_3H_7)_3$, $[(CH_3)_3SiCH_2]_2Si(OCH_3)_2$, $[(CH_3)_3SiCH_2]_2Si(OC_2H_5)_2$, $[(CH_3)_3SiCH_2]_2Si(OC_3H_7)_2$, $[(CH_3)_3Si(CH_2)_2]_2Si(OCH_3)_2$, $[(CH_3)_3Si(CH_2)_2]_2Si(OC_2H_5)_2$, $[(CH_3)_3Si(CH_2)_2]_2Si(OC_3H_7)_2$, $[(CH_3)_3Si(CH_2)_3]_2Si(OCH_3)_2$, $[(CH_3)_3Si(CH_2)_3]_2Si(OC_2H_5)_2$, $[(CH_3)_3Si(CH_2)_3]_2Si(OC_3H_7)_2$, $[(CH_3)_3Si(CH_2)_4]_2Si(OCH_3)_2$, $[(CH_3)_3Si(CH_2)_4]_2Si(OC_2H_5)_2$, $[(CH_3)_3Si(CH_2)_4]_2Si(OC_3H_7)_2$, $(C_2H_5)_3SiCH_2Si(OCH_3)_3$, $(C_2H_5)_3SiCH_2Si(OC_2H_5)_3$, $(C_2H_5)_3SiCH_2Si(OC_3H_7)_3$, $(C_2H_5)_3Si(CH_2)_2Si(OCH_3)_3$, $(C_2H_5)_3Si(CH_2)_2Si(OC_2H_5)_3$, $(C_2H_5)_3Si(CH_2)_2Si(OC_3H_7)_3$, $(C_2H_5)_3Si(CH_2)_3Si(OCH_3)_3$, $(C_2H_5)_3Si(CH_2)_3Si(OC_2H_5)_3$, $(C_2H_5)_3Si(CH_2)_3Si(OC_3H_7)_3$, $(C_2H_5)_3Si(CH_2)_4Si(OCH_3)_3$, $(C_2H_5)_3Si(CH_2)_4Si(OC_2H_5)_3$, $(C_2H_5)_3Si(CH_2)_4Si(OC_3H_7)_3$, $[(C_2H_5)_3SiCH_2]_2Si(OCH_3)_2$, $[(C_2H_5)_3SiCH_2]_2Si(OC_2H_5)_2$, $[(C_2H_5)_3Si(CH_2)_2]_2Si(OCH_3)_2$, $[(C_2H_5)_3Si(CH_2)_2]_2Si(OC_2H_5)_2$, $[(C_2H_5)_3Si(CH_2)_3]_2Si(OCH_3)_2$, $[(C_2H_5)_3Si(CH_2)_3]_2Si(OC_2H_5)_2$, $[(C_2H_5)_3Si(CH_2)_4]_2Si(OCH_3)_2$, $[(C_2H_5)_3Si(CH_2)_4]_2Si(OC_2H_5)_2$, $(iso-C_3H_7)(CH_3)_2SiCH_2Si(OCH_3)_3$, $(iso-C_3H_7)(CH_3)_2SiCH_2Si(OC_2H_5)_3$, $(iso-C_3H_7)(CH_3)_2SiCH_2Si(OC_3H_7)_3$, $(iso-C_3H_7)(CH_3)_2Si(CH_2)_2Si(OCH_3)_3$, $(iso-C_3H_7)(CH_3)_2Si(CH_2)_2Si(OC_2H_5)_3$, $(iso-C_3H_7)(CH_3)_2Si(CH_2)_2Si(OC_3H_7)_3$, $(iso-C_3H_7)(CH_3)_2Si(OCH_3)_3$, $(iso-C_3H_7)(CH_3)_2Si(CH_2)_3Si(OC_2H_5)_3$, $(iso-C_3H_7)(CH_3)_2Si(OC_3H_7)_3$, $(iso-C_3H_7)(CH_3)_2Si(CH_2)_4Si(OCH_3)_3$ $(iso-C_3H_7)(CH_3)_2Si(CH_2)_4Si(OC_2H_5)_3$, $(iso-C_3H_7)(CH_3)_2Si(CH_2)_4Si(OC_3H_7)_3$, $[(iso-C_3H_7)(CH_3)_2SiCH_2]_2Si(OCH_3)_2$, $[(iso-C_3H_7)(CH_3)_2SiCH_2]_2Si(OC_2H_5)_2$, $[(iso-C_3H_7)(CH_3)_2Si(CH_2)_2]_2Si(OCH_3)_2$, $[(iso-C_3H_7)(CH_3)_2Si(CH_2)_2]_2Si(OC_2H_5)_2$, $[(iso-C_3H_7)(CH_3)_2Si(CH_2)_3]_2Si(OCH_3)_2$, $[(iso-C_3H_7)(CH_3)_2Si(CH_2)_3]_2Si(OC_2H_5)_2$, $[(iso-C_3H_7)(CH_3)_2Si(CH_2)_4]_2Si(OCH_3)_2$, $[(iso-C_3H_7)(CH_3)_2Si(CH_2)_4]_2Si(OC_2H_5)_2$, $(tert-C_4H_9)(CH_3)_2SiCH_2Si(OCH_3)_3$, $(tert-C_4H_9)(CH_3)_2SiCH_2Si(OC_2H_5)_3$, $(tert-C_4H_9)(CH_3)_2SiCH_2Si(OC_3H_7)_3$, $(tert-C_4H_9)(CH_3)_2Si(CH_2)_2Si(OCH_3)_3$, $(tert-C_4H_9)(CH_3)_2Si(CH_2)_2Si(OC_2H_5)_3$, $(tert-C_4H_9)(CH_3)_2Si(CH_2)_2Si(OC_3H_7)_3$, $(tert-C_4H_9)(CH_3)_2Si(CH_2)_3Si(OCH_3)_3$, (tert-$C_4H_9$)($CH_3$)$_2$Si($CH_2$)$_3$Si($OC_2H_5$)$_3$, (tert-$C_4H_9$)($CH_3$)$_2$Si($CH_2$)$_3$Si($OC_3H_7$)$_3$, (tert-$C_4H_9$)($CH_3$)$_2$Si($CH_2$)$_4$Si($OCH_3$)$_3$, (tert-$C_4H_9$)($CH_3$)$_2$Si($CH_2$)$_4$Si($OC_2H_5$)$_3$, (tert-$C_4H_9$)($CH_3$)$_2$Si($CH_2$)$_4$Si($OC_3H_7$)$_3$, [(tert-$C_4H_9$)($CH_3$)$_2$SiCH$_2$]$_2$Si($OCH_3$)$_2$, [(tert-$C_4H_9$)($CH_3$)$_2$SiCH$_2$]$_2$Si($OC_2H_5$)$_2$, [(tert-$C_4H_9$)($CH_3$)$_2$Si($CH_2$)$_2$]$_2$Si($OCH_3$)$_2$, [(tert-$C_4H_9$)($CH_3$)$_2$Si($CH_2$)$_2$]$_2$Si($OC_2H_5$)$_2$, [(tert-$C_4H_9$)($CH_3$)$_2$Si($CH_2$)$_3$]$_2$Si($OCH_3$)$_2$, [(tert-$C_4H_9$)($CH_3$)$_2$Si($CH_2$)$_3$]$_2$Si($OC_2H_5$)$_2$, [(tert-$C_4H_9$)($CH_3$)$_2$Si($CH_2$)$_4$]$_2$Si($OCH_3$)$_2$ and [(tert-$C_4H_9$)($CH_3$)$_2$Si($CH_2$)$_4$]$_2$Si($OC_2H_5$)$_2$; and when X is —O—, ($CH_3$)$_3$SiOSi($OCH_3$)$_3$, ($CH_3$)$_3$SiOSi($OC_2H_5$)$_3$, ($CH_3$)$_3$SiOSi($OC_3H_7$)$_3$, [($CH_3$)$_3$SiO]$_2$Si($OCH_3$)$_2$, [($CH_3$)$_3$SiO]$_2$Si($OC_2H_5$)$_2$, ($C_2H_5$)$_3$SiOSi($OCH_3$)$_3$, ($C_2H_5$)$_3$SiOSi($OC_2H_5$)$_3$, ($C_2H_5$)$_3$SiOSi($OC_3H_7$)$_3$, [($C_2H_5$)$_3$SiO]$_2$Si($OCH_3$)$_2$, [($C_2H_5$)$_3$SiO]$_2$Si($OC_2H_5$)$_2$, (iso-$C_3H_7$)($CH_3$)$_2$SiOSi($OCH_3$)$_3$, (iso-$C_3H_7$)($CH_3$)$_2$SiOSi($OC_2H_5$)$_3$, (iso-$C_3H_7$)($CH_3$)$_2$SiOSi($OC_3H_7$)$_3$, [(iso-$C_3H_7$)($CH_3$)$_2$SiO]$_2$Si($OCH_3$)$_2$, [(iso-$C_3H_7$)($CH_3$)$_2$SiO]$_2$Si($OC_2H_5$)$_2$, (tert-$C_4H_9$)($CH_3$)$_2$SiOSi($OCH_3$)$_3$, (tert-$C_4H_9$)($CH_3$)$_2$SiOSi($OC_2H_5$)$_3$, (tert-$C_4H_9$)($CH_3$)$_2$SiOSi($OC_3H_7$)$_3$, [(tert-$C_4H_9$)($CH_3$)$_2$SiO]$_2$Si($OCH_3$)$_2$, and [(tert-$C_4H_9$)($CH_3$)$_2$SiO]$_2$Si($OC_2H_5$)$_2$, and the mixtures thereof. Among those above, it is preferred to use at least one selected from the group consisting of ($CH_3$)$_3$SiCH$_2$Si($OCH_3$)$_3$, ($CH_3$)$_3$SiCH$_2$Si($OC_2H_5$)$_3$, ($CH_3$)$_3$SiCH$_2$Si($OC_3H_7$)$_3$, ($CH_3$)$_3$Si($CH_2$)$_2$Si($OCH_3$)$_3$, ($CH_3$)$_3$Si($CH_2$)$_2$Si($OC_2H_5$)$_3$, ($CH_3$)$_3$Si($CH_2$)$_2$Si($OC_3H_7$)$_3$, ($CH_3$)$_3$Si($CH_2$)$_3$Si($OCH_3$)$_3$, ($CH_3$)$_3$Si($CH_2$)$_3$Si($OC_2H_5$)$_3$, ($CH_3$)$_3$Si($CH_2$)$_3$Si($OC_3H_7$)$_3$, ($CH_3$)$_3$SiOSi($OCH_3$)$_3$, ($CH_3$)$_3$SiOSi($OC_2H_5$)$_3$, ($CH_3$)$_3$SiOSi($OC_3H_7$)$_3$, ($C_2H_5$)$_3$SiOSi($OCH_3$)$_3$, ($C_2H_5$)$_3$SiOSi($OC_2H_5$)$_3$ and ($C_2H_5$)$_3$SiOSi($OC_3H_7$)$_3$.

As for the ratio of the cocatalyst component to the main catalyst component in the catalyst system for propylene polymerization used in the method for producing a propylene polymer according to the present invention, although it is somewhat depending on the type of a polymerization method used, the molar ratio of the aluminum atom in the cocatalyst component to the titanium atom in the main catalyst component is preferably in the range of 1~1000, and more preferably in the range of 10~300. When the ratio of the aluminum atom in the cocatalyst component to the titanium atom in the main catalyst component is out of the said range of 1~1000, the polymerization activity will be dramatically decreased.

As for the ratio of the external electron donor to the main catalyst in the catalyst system for propylene polymerization used in the method for producing a propylene polymer according to the present invention, although it may vary depending on the type of a polymerization method used, the molar ratio of the silicon atom in the external electron donor to the titanium atom in the main catalyst is preferably in the range of 0.1~500, and more preferably in the range of 1~100. When the molar ratio of the silicon atom in the external electron donor to the titanium atom of the main catalyst component is less than 0.1, the stereoregularity of the resulted propylene polymer becomes significantly lowered. On the other hand, when it is more than 500, the polymerization activity of the catalyst becomes remarkably decreased.

In the method for producing a propylene polymer according to the present invention, the temperature of the polymerization reaction is preferably 20~120° C. When the polymerization temperature is less than 20° C., the reaction wouldn't be sufficiently carried out, and when it is more than 120° C., it would give adverse effects to the physical properties of the resulted polymer.

The method for producing a propylene polymer according to the present invention may be effectively applied to the preparation of a copolymer of propylene with alpha-olefins having 2~6 (exclusive of 3) carbon atoms as well as the preparation of a propylene homopolymer.

According to the method for producing a propylene polymer of the present invention, it is possible to obtain a propylene polymer having excellent melt flowability and high stereoregularity with 97% or more of the isotacticity index which indicates the degree of stereoregularity.

Hereinafter, the present invention is further described in detail through examples given below. These examples have only illustrative purposes, and by no means limit the scope of the present invention.

EXAMPLES

Example 1

[Preparation of a Main Catalyst Component]

200 ml of toluene and 25 g (0.219 mol) of diethoxymagnesium were introduced into a 1 L glass reactor equipped with a stirrer, wherein the atmosphere inside the reactor had been sufficiently substituted with nitrogen, and the mixture was stirred at 250 rpm, while maintaining the temperature at 10° C. To the mixture, 75 ml of titanium tetrachloride was added over 30 minutes, and the temperature of the reactor was elevated to 100° C. at the speed of 0.5° C. per minute. During the temperature elevation, when the temperature was once reached at 25° C., 7.5 ml (0.028 mol) of diisobutylphthalate (DIBP) was added thereto. The resulted mixture was allowed to stand for further reaction at 110° C. for 1 hour, then stirring was stopped so that solid products can be settled down, and the supernatant liquid was removed. The resulted product was washed by adding 250 ml of fresh toluene thereto and stirring the mixture for 15 minutes. The resulted washed product was washed once again by the same method.

To the resulted solid product as obtained above, 200 ml of toluene was further added, and while maintaining the temperature at 80° C., 75 ml of titanium tetrachloride and then 5.0 ml of DIBP were sequentially added again with stirring at 250 rpm. Then the reactor temperature was elevated to 110° C. over 30 minutes. After maintaining the resulted mixture at 110° C. for 1 hour, stirring was stopped, and then the supernatant liquid was removed. Next, the resulted product was washed once with 250 ml of fresh toluene added thereto by the same method as described above.

To the resulted solid product as obtained above, 250 ml of toluene at 100° C. was further added to wash the product once again by the same method as described above. Then, the resulted washed product was further washed 6 times by using 250 ml of n-hexane at 40° C. for each run. After the total 6 times of washing with n-hexane, a main catalyst component was obtained as a pale yellow solid product. The solid main catalyst component was dried in a nitrogen stream for 8 hours, and the titanium content of the dried main catalyst component was 2.6 wt %.

[Propylene Polymerization]

A 2 L stainless autoclave, as a reactor, was loaded with a small glass vial charged with 5 mg of the catalyst obtained above, and then sufficiently purged with nitrogen for nitrogen substituted atmosphere. Into the reactor, 7.0 mmol of triethyl aluminum as a cocatalyst, 0.7 mmol of 1,1,1-trimethyl-3,3,3-triethoxydisilapropane (TMTEDSP)(chemical formula: ($CH_3$)$_3$SiCH$_2$Si($OC_2H_5$)$_3$, manufactured by JSI silicone Co., purity 98.6%) as an external electron donor were introduced together. Then, 1000 ml of hydrogen and 1.2 L of liquid propylene were sequentially introduced into the reactor, and the stirrer was started to operate to break the glass vial loaded inside the reactor as well as to start polymerization at the same time. At this point, the temperature was elevated to 70° C., and polymerization was carried out at 70° C., for 1 hour. After completion of the polymerization, unreacted propylene was completely degassed and then obtained was a propylene homopolymer.

From the weight of the obtained propylene homopolymer, the polymerization activity per hour was estimated, and the isotacticity index (I.I), melt flow rate(MFR) and melting point were determined. The results were represented in Table 1.

In the above, the polymerization activity, isotacticity index and melt flow rate were determined by the following methods.

① Polymerization activity per hour (kg/g-catalyst):
amount of polymer production per hour (kg)/amount of catalyst(g)

② Isotacticity Index(I.I)(%):
100 (g)-weight of insoluble substances which were precipitated from the crystallization of 100 g of the obtained polymer in mixed xylene (g)

③ Melt Flow Rate (MFR) (g/10 minutes):
According to ASTM1238, determined at 230° C., under the load of 2.16 kg.

Examples 2~4

A propylene polymer was prepared by using the same catalyst system and the same method as in Example 1, except that the hydrogen being introduced in the above Propylene polymerization step was 1000 ml, and each amount of 1,1,1-trimethyl-3,3,3-triethoxydisilapropane (TMTEDSP) as an external electron donor for Examples 2~4 was 0.3 mmol, 0.5 mmol and 1.4 mmol, respectively.

With the resulted propylene polymer, the polymerization activity, isotacticity index and melt flow rate were determined by the same method as described in Example 1. The results were represented in Table 1.

Examples 5~7

A propylene polymer was prepared by using the same catalyst system and the same method as in Example 1, except that each of the hydrogen being introduced in the above Propylene polymerization step for Examples 5~7 was 500 ml, 2000 ml and 4000 ml, respectively.

With the resulted propylene polymer, the polymerization activity, isotacticity index and melt flow rate were determined by the same method as described in Example 1. The results were represented in Table 1.

Examples 8~10

A propylene polymer was prepared by using the same main catalyst component and the same cocatalyst component, and by the same method as in Example 1, except that in the Propylene polymerization step, 0.7 mmol of 1,1,1-trimethyl-4,4,4-triethoxydisilabutane (TMTEDSB) (chemical formula $(CH_3)_3Si(CH_2)_2Si(OC_2H_5)_3$, manufactured by JSI silicone Co., purity 95.1%) was used as an external electron donor instead of 0.7 mmol of 1,1,1-trimethyl-3,3,3-triethoxydisilapropane (TMTEDSP), and each amount of the hydrogen being introduced for Examples 8~10 was 500 ml, 1000 ml and 2000 ml, respectively.

With the resulted propylene polymer, the polymerization activity, isotacticity index and melt flow rate were determined by the same method as described in Example 1. The results were represented in Table 1.

Examples 11~13

A propylene polymer was prepared by using the same main catalyst component and the same cocatalyst component, and by the same method as in Example 1, except that in the Propylene polymerization step, 0.7 mmol of 1,1,1-trimethyl-5,5,5-triethoxydisilapentane (TMTEDSPN) (chemical formula $(CH_3)_3Si(CH_2)_3Si(OC_2H_5)_3$, manufactured by JSI silicone Co., purity 99.1%) was used as an external electron donor instead of 0.7 mmol of 1,1,1-trimethyl-3,3,3-triethoxydisilapropane (TMTEDSP), and each amount of the hydrogen being introduced for Examples 11~13 was 500 ml, 1000 ml and 2000 ml, respectively.

With the resulted propylene polymer, the polymerization activity, isotacticity index and melt flow rate were determined by the same method as described in Example 1. The results were represented in Table 1.

Examples 14~16

A propylene polymer was prepared by using the same main catalyst component and the same cocatalyst component, and by the same method as in Example 1, except that in the Propylene polymerization step, 0.7 mmol of 1,1,1-trimethyl-3,3,3-trimethoxydisilapropane (TMTMDSP) (chemical formula $(CH_3)_3SiCH_2Si(OCH_3)_3$, manufactured by JSI silicone Co., purity 98.1%) was used as an external electron donor instead of 0.7 mmol of 1,1,1-trimethyl-3,3,3-triethoxydisilapropane (TMTEDSP), and each amount of the hydrogen being introduced for Examples 14~16 was 500 ml, 1000 ml and 2000 ml, respectively.

With the resulted propylene polymer, the polymerization activity, isotacticity index and melt flow rate were determined by the same method as described in Example 1. The results were represented in Table 1.

Examples 17~19

A propylene polymer was prepared by using the same main catalyst component and the same cocatalyst component, and by the same method as in Example 1, except that in the Propylene polymerization step, 0.7 mmol of 1,1,1-trimethyl-3,3,3-triethoxydisiloxane (TMTEDSO) (chemical formula $(CH_3)_3SiOSi(OC_2H_5)_3$, manufactured by JSI silicone Co., purity 97.8%) was used as an external electron donor instead of 0.7 mmol of 1,1,1-trimethyl-3,3,3-triethoxydisilapropane (TMTEDSP), and each amount of the hydrogen being introduced for Examples 17~19 was 500 ml, 1000 ml and 2000 ml, respectively.

With the resulted propylene polymer, the polymerization activity, isotacticity index and melt flow rate were determined by the same method as described in Example 1. The results were represented in Table 1.

Comparative Examples 1~4

A propylene polymer was prepared by using the same main catalyst component and the same cocatalyst component, and by the same method as in Example 1, except that in the Propylene polymerization step, 0.7 mmol of cyclohexylmethyldimethoxysilane (CHMDMS) was used as an external electron donor instead of 0.7 mmol of 1,1,1-trimethyl-3,3,3-triethoxydisilapropane (TMTEDSP), and each amount of the hydrogen being introduced for Comparative Examples 1~4 was 500 ml, 1000 ml, 2000 ml and 4000 ml, respectively.

With the resulted propylene polymer, the polymerization activity, isotacticity index and melt flow rate were determined by the same method as described in Example 1. The results were represented in Table 1.

TABLE 1

| Units | | External electron donor | | Polymerization activity per | | |
|---|---|---|---|---|---|---|
| | | species | Amount (mmol) | Hydrogen (ml) | hour (kg/g-catalyst) | I.I (%) | MFR (g/10 min) |
| Examples | 1 | TMTEDSP | 0.7 | 1000 | 46 | 97.8 | 46.5 |
| | 2 | TMTEDSP | 0.3 | 1000 | 43 | 97.9 | 48.2 |
| | 3 | TMTEDSP | 0.5 | 1000 | 45 | 97.5 | 47.2 |
| | 4 | TMTEDSP | 1.4 | 1000 | 43 | 98.0 | 42.8 |
| | 5 | TMTEDSP | 0.7 | 500 | 41 | 97.8 | 18.5 |
| | 6 | TMTEDSP | 0.7 | 2000 | 48 | 97.5 | 87.4 |
| | 7 | TMTEDSP | 0.7 | 4000 | 45 | 97.4 | 186 |
| | 8 | TMTEDSB | 0.7 | 500 | 33 | 97.2 | 33.4 |
| | 9 | TMTEDSB | 0.7 | 1000 | 36 | 97.5 | 72.5 |
| | 10 | TMTEDSB | 0.7 | 2000 | 39 | 97.1 | 147 |
| | 11 | TMTEDSPN | 0.7 | 500 | 36 | 97.6 | 38.3 |
| | 12 | TMTEDSPN | 0.7 | 1000 | 38 | 97.5 | 70.2 |
| | 13 | TMTEDSPN | 0.7 | 2000 | 41 | 97.4 | 157 |
| | 14 | TMTMDSP | 0.7 | 500 | 28 | 97.0 | 7.3 |
| | 15 | TMTMDSP | 0.7 | 1000 | 32 | 97.8 | 16.2 |
| | 16 | TMTMDSP | 0.7 | 2000 | 36 | 97.1 | 39.6 |
| | 17 | TMTEDSO | 0.7 | 500 | 37 | 97.6 | 46.7 |
| | 18 | TMTEDSO | 0.7 | 1000 | 38 | 97.3 | 125 |
| | 19 | TMTEDSO | 0.7 | 2000 | 43 | 97.2 | 231 |
| Com. Examples | 1 | CHMDMS | 0.7 | 500 | 50 | 97.8 | 3.1 |
| | 2 | CHMDMS | 0.7 | 1000 | 52 | 98.2 | 9.7 |
| | 3 | CHMDMS | 0.7 | 2000 | 54 | 98.0 | 24.5 |
| | 4 | CHMDMS | 0.7 | 4000 | 51 | 97.9 | 51.8 |

From the results shown in the above Table 1, it can be found that in propylene polymerization using a catalyst system comprised of a Ziegler type main catalyst for propylene polymerization, an alkyl aluminum cocatalyst, and an external electron donor, by using an alkoxysilane compound comprising a trialkylsilyl group in the molecular structure thereof as an external donor as in Examples 1~19, it was possible to easily obtain a propylene polymer having a much higher melt flow rate with a small amount of hydrogen owing to the dramatically improved reactivity of hydrogen that is a molecular weight regulator, as compared to when using cyclohexylmethyldimethoxysilane that has been conventionally used as a commercial external electron donor as in Comparative examples 1~4.

INDUSTRIAL APPLICABILITY

As it has been described so far, according to the present invention, it is possible to easily produce a propylene polymer having sufficiently high isotactic index as much as 97% or more and relatively great melt flow rate at the same time. Therefore, the present invention has an advantage that, by applying the method of the present invention to commercial processes, a propylene polymer having a significantly great melt flow rate can be easily obtained with conventional process equipment under conventional polymerization conditions.

What is claimed is:

1. A method for producing a propylene polymer using a catalyst system for propylene polymerization, wherein the catalyst system comprises: a Ziegler type catalyst comprising magnesium, titanium, halogen and an internal electron donor, as a main catalyst component; and an alkyl aluminum compound as a cocatalyst; and an alkoxysilane compound represented as a general formula of $[R^2R^3R^4SiX]_m SiR^5_n (OR^6)_{4-m-n}$, wherein each of $R^2$, $R^3$, $R^4$ and $R^5$ is an alkyl having 1-6 carbon atoms, respectively; X represents $—(CH_2)_p—$, wherein p is an integer of 1~4, or —O—; $R^6$ is an alkyl having 1~3 carbon atoms; m is an integer of 1 or 2; n is an integer of 0 or 1; and m+n is an integer of 1 or 2 as an external electron donor.

2. The method for producing a propylene polymer according to claim 1, wherein the main catalyst component comprises 5~40 wt % of magnesium, 0.5~10 wt % of titanium, 50~85 wt % of halogen and 2.5~30 wt % of the internal electron donor.

3. The method for producing a propylene polymer according to claim 1, wherein the internal electron donor is at least one selected from the group consisting of dimethyl phthalate, diethyl phthalate, di-n-propyl phthalate, di-isopropyl phthalate, di-n-butyl phthalate, di-isobutyl phthalate, di-n-pentyl phthalate, di(2-methylbutyl)phthalate, di(3-methylbutyl)phthalate, di-neopentyl phthalate, di-n-hexyl phthalate, di(2-methylpentyl) phthalate, di(3-methylpentyl)phthalate, di-isohexylphthalate, di-neohexyl phthalate, di (2,3-dimethylbutyl) phthalate, di-n-heptyle phthalate, di(2-methylhexyl) phthalate, di(2-ethylpentyl) phthalate, di-iso-heptyl phthalate, di-neoheptyl phthalate, di-n-ocytl phthatlate, di(2-methylheptyl) phthalate, di-isooctyle phthalate, di(3-ethylhexyl) phthalate, di-neooctyle phthalate, di-n-nonyl phthalate, di-isononyl phthalate, di-n-decyl phthalate and di-isodecyl phthalate.

4. The method for producing a propylene polymer according to claim 1, wherein the cocatalyst component is an alkyl aluminum compound represented as a general formula of $AlR^1{}_3$, wherein $R^1$ is an alkyl having 1~4 carbon atoms.

5. The method for producing a propylene polymer according to claim 1, wherein the external electron donor is at least one selected from the group consisting of $(CH_3)_3SiCH_2Si(OCH_3)_3$, $(CH_3)_3SiCH_2Si(OC_2H_5)_3$, $(CH_3)_3SiCH_2Si(OC_3H_7)_3$, $(CH_3)_3Si(CH_2)_2Si(OCH_3)_3$, $(CH_3)_3Si(CH_2)_2Si(OC_2H_5)_3$, $(CH_3)_3Si(CH_2)_2Si(OC_3H_7)_3$, $(CH_3)_3Si(CH_2)_3Si(OCH_3)_3$, $(CH_3)_3Si(CH_2)_3Si(OC_2H_5)_3$, $(CH_3)_3Si(CH_2)_3Si(OC_3H_7)_3$, $(CH_3)_3SiOSi(OCH_3)_3$, $(CH_3)_3SiOSi(OC_2H_5)_3$, $(CH_3)_3SiOSi(OC_3H_7)_3$, $(C_2H_5)_3SiOSi(OCH_3)_3$, $(C_2H_5)_3SiOSi(OC_2H_5)_3$, and $(C_2H_5)_3SiOSi(OC_3H_7)_3$.

6. The method for producing a propylene polymer according to claim 1, wherein the molar ratio of the aluminum atom in the cocatalyst component to the titanium atom in the main cocatalyst component is in the range of 1~1000.

7. The method for producing a propylene polymer according to claim 1, wherein the molar ratio of the silicon atom in the external electron donor to the titanium atom in the main catalyst component is in the range of 0.1~500.

* * * * *